Patented Jan. 5, 1932

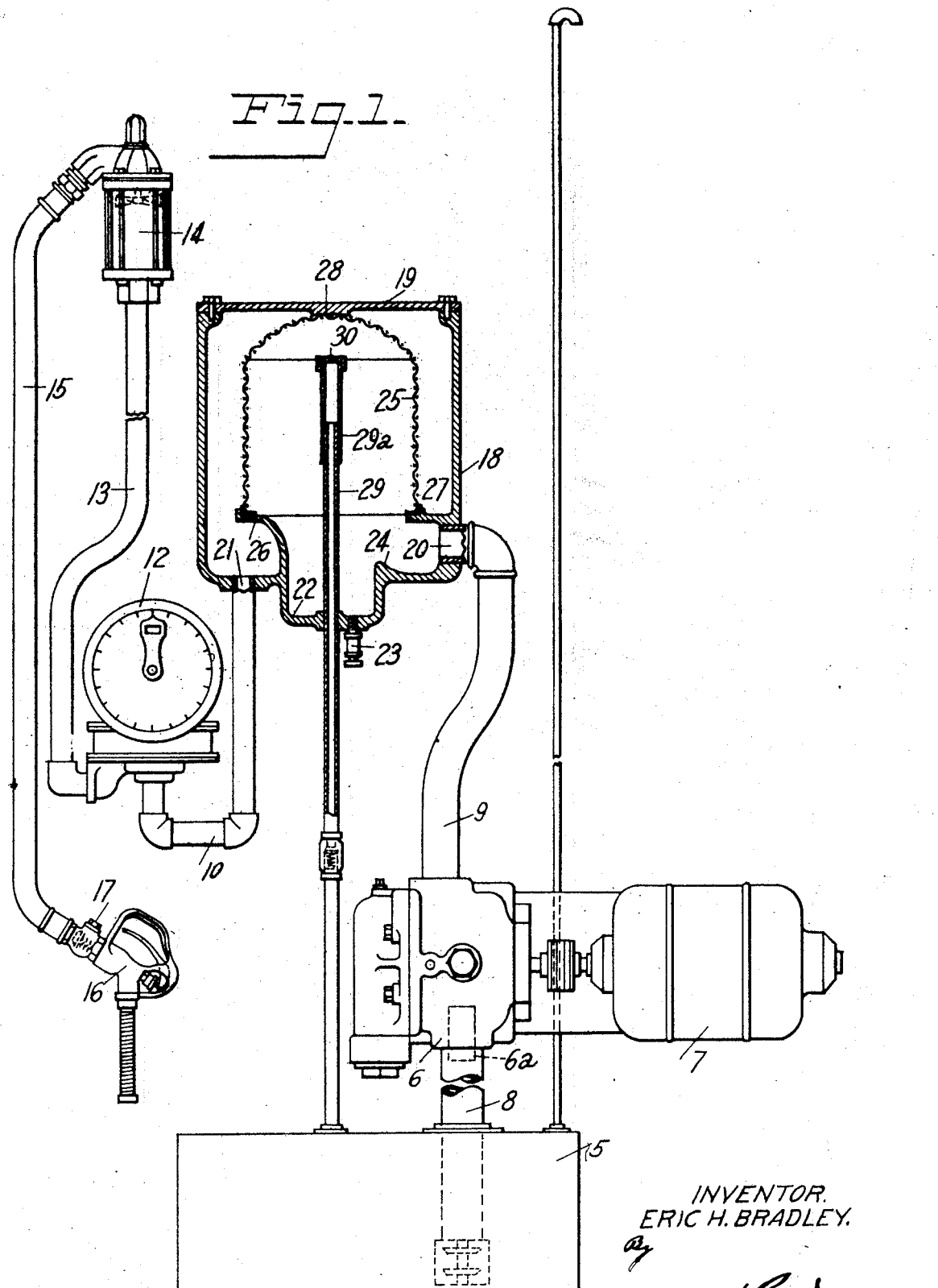

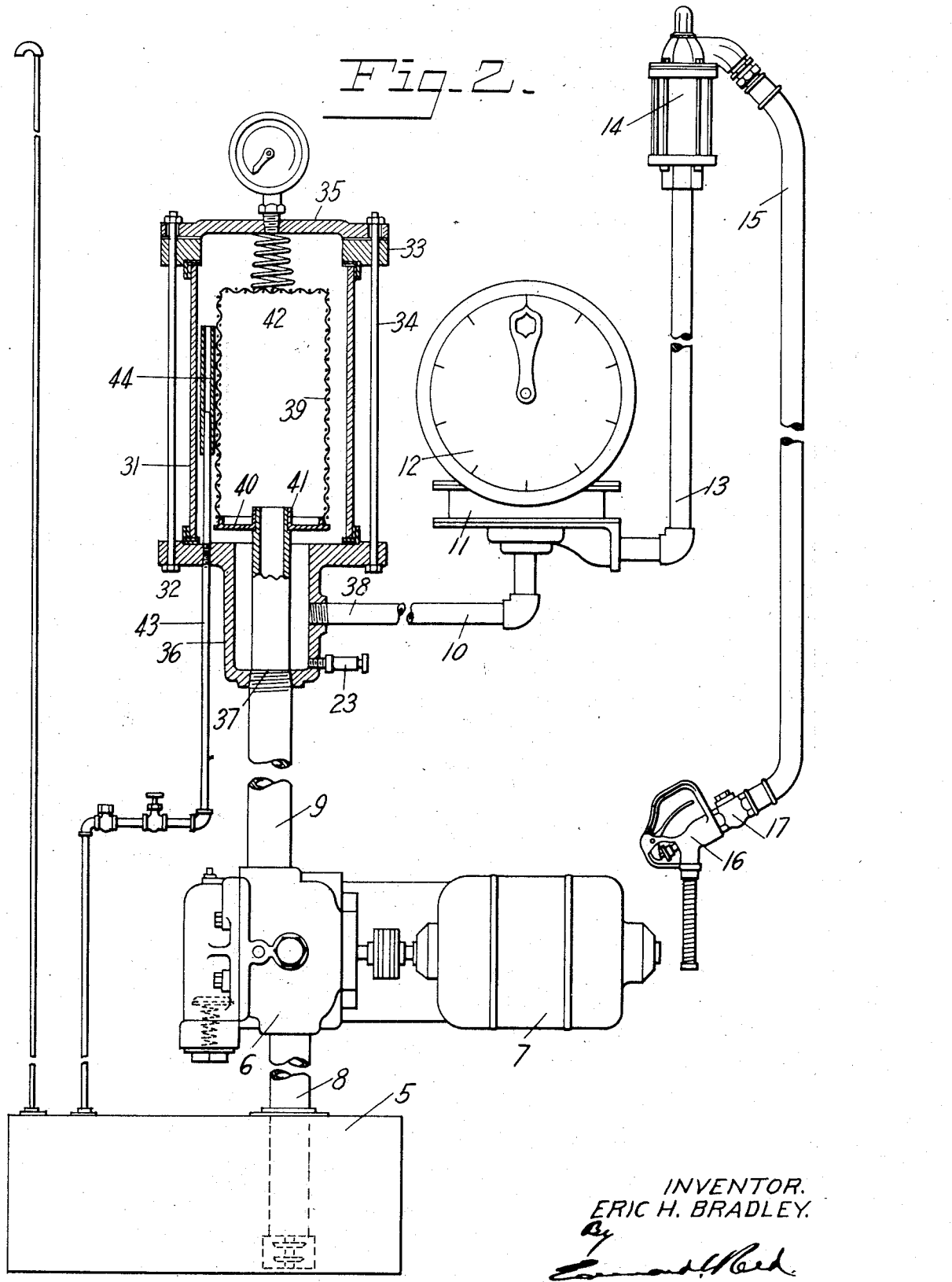

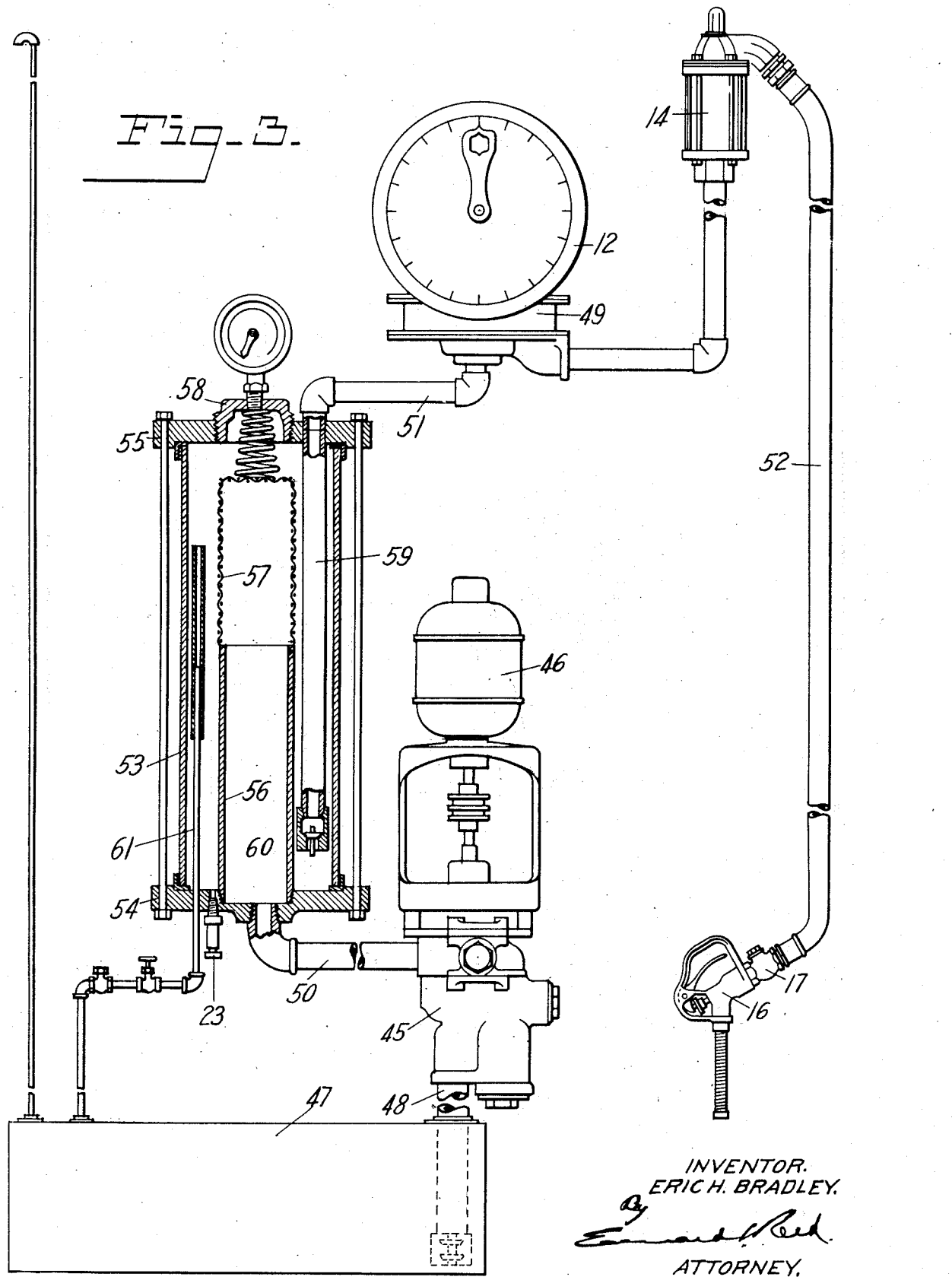

1,840,079

UNITED STATES PATENT OFFICE

ERIC HEYWOOD BRADLEY, OF DAYTON, OHIO, ASSIGNOR TO NATIONAL PUMPS CORPORATION, OF DAYTON, OHIO, A CORPORATION OF OHIO

LIQUID DISPENSING APPARATUS

Application filed December 19, 1929. Serial No. 415,200.

This invention relates to liquid dispensing apparatus and more particularly to a dispensing apparatus of that type in which a flow meter is interposed in the discharge line to measure and register the quantity of liquid dispensed. Dispensing apparatus of this type are commonly used at automobile filling stations for dispensing gasoline to automobiles. It is found in practice that commercial gasoline contains air in solution and that in dispensing gasoline more or less air will enter the dicharge line along with the liquid. When the gasoline is relieved of pressure or is agitated, as by a pump in the discharge line, the dissolved air will be freed and will form bubbles. Further, the action of the pump will cause portions of the gasoline to be vaporized. This air and vapor, in the form of bubbles, will pass through the meter along with the liquid and will actuate the meter to the same extent that it would be actuated by a like quantity of liquid. Consequently the quantity of liquid actually delivered to the customer will be less than the amount shown on the register.

One object of the present invention is to provide a device for separating the free air and vapor from the liquid before the latter is delivered to the meter.

A further object of the invention is to provide such a device which may be interposed in the discharge line in advance of the meter without retarding or otherwise interfering with the flow of liquid through the discharge line.

A further object of the invention is to provide such a device which will remove solid matter from the liquid passing through the same.

A further object of the invention is to provide such a device which will be very simple in its construction and operation, which can be produced at a low cost and which can be installed in the discharge line of the dispensing apparatus without material modification thereof.

A further object of the invention is to provide a device which will cushion the discharge line and protect the same against shock due to the sudden closing of the discharge valve.

Other objects of the invention will appear as the apparatus is described in detail.

In the accompanying drawings Fig. 1 is an elevation, partly broken away, of a dispensing apparatus, showing the separating device in section; Fig. 2 is a similar view showing a different form of separator; and Fig. 3 is a similar view showing a slightly different arrangement of the dispensing apparatus and of the separating device.

In these drawings I have illustrated certain embodiments of my invention, which differ one from the other slightly in construction and arrangement but which operate upon the same principle. It will be understood that these embodiments have been chosen for the purpose of illustration only and that the separating device may take various forms and may be utilized in connection with dispensing apparatus of various kinds.

In all forms of the invention here illustrated a separating device is interposed in the discharge line of a dispensing apparatus which employs a pump for discharging the liquid from the storage reservoir through the discharge line, the meter and a suitable conduit to the customer's receptacle. The discharge line is connected with a suitable source of supply such as the usual underground reservoir, as shown at 5, and the liquid is discharged from the reservoir through the discharge line by a rotary pump 6, which may have the usual spring controlled by-pass valve to permit the circulation of liquid within the pump when the discharge line is closed. The pump is directly connected with an electric motor 7, both the motor and the pump being shown in Fig. 1 as arranged on a horizontal axis. The intake side of the pump is connected with the reservoir by a pipe 8 and the outlet side of the pump is connected by pipes 9 and 10 with a flow meter 11, which is provided with the usual indicating device 12. A pipe 13 leads from the meter, and, in the present instance, this pipe is arranged in an upright position and has at its upper end a visual indicator 14 to indicate to the customer whether or not the discharge line between the reservoir and the indicator is full of liquid. A flexible hose 15 is connected with the top of the visual indicator and has at its lower end a nozzle 16 through which the liquid is finally discharged. In a dispensing apparatus of this character the discharge of the liquid is usually controlled by a valve in the nozzle 16 so that the discharge line as a whole will remain full of liquid between dispensing operations. The nozzle 16 is here shown as a valved nozzle of the usual type. Interposed in the line adjacent to the nozzle and, in the present instance, between the nozzle and the hose 15, is a check valve 17 which opens in the direction of the flow of the liquid but the opening of which is retarded by a spring, or otherwise, to such an extent that it will not open under gravity pressure of the liquid in the hose but will open under pump pressure. This check valve thus prevents the hose being drained, when the pump is idle, by the opening of the nozzle valve. Further, some types of flow meters require a certain definite pressure in the line for their proper operation and the spring actuated check valve will cause the necessary pressure to be produced in the line before the liquid can be discharged.

To prevent free air or vapor which enters the discharge line from passing through the meter and actuating the same a separating device is interposed in the discharging line in advance of the meter. This separating device may be interposed in the line at any point in advance of the meter but when there is a pump in the discharge line it should be between the pump and the meter and, as here shown, it is interposed between the pipes 9 and 10 of the discharge line. The separating device may take various forms but it preferably comprises a casing having an inlet and an outlet and having a separating element arranged therein between the inlet and the outlet to prevent the air or vapor which enters the casing with the liquid from being discharged therefrom with the liquid. In that form of the device shown in Fig. 1 the casing, 18, is in the form of a casting, preferably cylindrical in cross section, the upper end of which is tightly closed by a removable top plate or closure 19. In the lower portion thereof the casing is provided with an inlet 20, connected with the pipe 9 of the discharge line, and with an outlet 21 connected with the pipe 10 of the discharge line. The bottom wall is provided with a depressed portion forming a sump 22, which, in the present instance, is arranged below the level of the inlet and outlet so that any sediment or foreign matter entering the casing will settle into the sump, which is provided with a drain cock 23. The bottom wall of the casing is preferably provided between the inlet and the sump with an upwardly curved portion, as shown at 24, which will direct the liquid entering the casing upwardly away from the sump. Mounted within the casing is a separating element 25 which is formed either in whole or in part of foraminous material, such as fine mesh screen fabric or other porous material, and is arranged between the inlet and the outlet. Preferably this separating element is substantially cylindrical in shape and is spaced from the cylindrical wall of the casing. It may be supported within the casing in any suitable manner, as by providing the casing with a flange 26 extending upwardly from the bottom wall about the sump and forming a seat for the lower edge of the separating element. In the arrangement shown in Fig. 1 the supporting flange 26 extends upwardly from the bottom wall except at that point adjacent to the inlet where it extends laterally to the side wall, as shown at 27, thus causing the inlet 20 to communicate directly with the interior of the hollow separating element. The separating element may be removable to permit the same to be cleaned or repaired and it is here shown as held upon its seat by the top plate 19 which has a dependent portion or pad 28 bearing upon the dome-shaped upper end of the separating element, which has sufficient resiliency to permit the top plate to retain the separating element firmly on its seat. By removing the closure 19 the separating element may be easily removed without draining the line.

The outlet 21 of the casing is of such capacity with relation to the inlet 20 that the liquid will escape from the casing less rapidly than it enters the same, thus causing the liquid to rise in the casing. This difference in capacities may be effected in various ways, as any restriction in the discharge line beyond the casing, even the friction in the line, will retard the outflow of liquid and correspondingly reduce the capacity of the outlet. If desired, the outlet opening 21 may be made smaller than the inlet opening 20, as shown in the drawings, but this is not essential. Ordinarily the discharge nozzle is of smaller diameter than the hose, as shown, and serves to very satisfactorily reduce the capacity of the outlet, regardless of the relative sizes of the inlet and outlet openings. Because of the difference in the capacities of the inlet and the outlet, liquid entering the casing under pressure from the pump 6 will rise therein and compress the air contained by the casing in the upper portion of that casing. The level to which the liquid will rise will be determined by the pressure of the liquid, that is, the liquid will rise until the pressure of the air equals the pressure on the liquid, and the level of the liquid will therefore be a considerable distance above both the inlet and the outlet. The liquid under pressure about the foraminous wall of the separating element will resist the passage of air and vapor through that foraminous wall and the bubbles of air and vapor will follow the line of least resistance and rise to the top of the liquid where they will escape into the air space above the liquid. Inasmuch as the liquid is withdrawn from the lower portion of the casing, a considerable distance below the level of the liquid, it will be apparent that air or vapor in the upper portion of the casing cannot reach the outlet and the only air or vapor which can reach the outlet will be such fine bubbles as may pass through the foraminated wall of the separating element and this will be of such a small quantity as to be negligible.

The device will operate in the manner described to separate the air or vapor from the liquid without the provision of any means for discharging the air or vapor from the casing. When air is mixed with gasoline under certain pressure conditions, such as exist within the casing, a relatively large quantity of air will be absorbed by or dissolved in the gasoline. The air which enters the casing with the liquid is either separated from the liquid and rises above the same or is very finely divided by its passage through the separating element and the pressure to which the air and gasoline are subjected is such as to cause all or a large part of such air to be dissolved in or absorbed by the liquid, and inasmuch as there is no appreciable increase in the volume of the liquid the actual quantity of the liquid delivered will be registered by the meter. It has been found that under operating conditions, as they ordinarily exist in a dispensing apparatus of this kind, the quantity of air or vapor which enters the casing will be but slightly, if at all, in excess of the absorption capacity of the liquid and that the apparatus will operate for long intervals without air or vapor accumulating above the liquid in objectionable quantities. Should relatively large quantities of air or vapor, or both, enter the casing with the liquid the accumulation of air and vapor in the upper part of the casing would force the liquid level down to such a point that air and vapor would escape with the liquid through the outlet. To take care of such a situation I have provided means for automatically controlling the air pressure within the casing and thereby maintaining the liquid at such a level that the air cannot reach the outlet. To accomplish this I prefer to provide the casing with a vent which will be so controlled by the level of the liquid that air can escape therethrough only when the liquid falls below a predetermined level. As shown in Fig. 1 a vent tube 29 leads from the upper portion of the casing to the storage reservoir 5. It may be arranged in any suitable position but, as here shown, it extends through the sump 22 into the separating element and has its upper end arranged near the top of the separating element where it is provided with a restricted orifice 30 constituting the intake for the vent tube. Preferably the vent tube is extensible to permit the intake orifice to be adjusted to different levels and, as here shown, the part 29a of the vent tube, which has the intake orifice, is slidably mounted on the lower part of the tube. If desired, the vent tube may be provided with means for regulating the capacity thereof or for closing the same, as conditions may require, and, as shown in Fig. 2, a valve 43a is interposed in the vent tube for that purpose.

When the pump 6 is first placed in operation the nozzle valve will usually be closed, thus preventing the escape of liquid from the casing and causing the liquid to rise in the casing and compress the air in the upper portion thereof. This pressure will be sufficient to compress the air above the vent so that the liquid will rise above the end of the tube and seal the vent. Small quantities of liquid will flow through the restricted orifice but there will not be sufficient to materially affect the pressure within the casing. When the nozzle valve is opened the flow of liquid from the separator will, of course, lower the level of the liquid, which will drop to approximately the level of the vent, thus permitting air to escape and by reducing the air pressure permitting the liquid to again rise above the level of the vent and seal the same. If only small quantities of air are entering the casing along with the liquid the vent will remain sealed, at least for a considerable period of time, but if larger quantities of air are entering the casing it will accumulate in the upper portion thereof and increase the air pressure so as to force the level of the liquid down to a level adjacent to the vent, thereby permitting the escape of air which will so relieve the pressure that the liquid level will again rise. In practice where any considerable amount of air is entering the casing the level of the liquid will be maintained slightly above the vent but so close thereto that small quantities of air will pass through the vent along with the liquid, the amount of air thus escaping depending upon the level of the liquid and the level of the liquid in turn depending upon the air pressure in the upper part of the casing. When the pump is shut down and the liquid pressure relieved the level of the liquid will drop and the air pressure will be restored to approximately atmospheric pressure.

To prevent the liquid being siphoned from the system in case the nozzle valve should leak, or the check valve in the nozzle should be omitted, the vent tube may be provided with a delayed action valve 29b which will permit the escape of air and liquid from the separator but will prevent air from entering the separator through the vent tube. This delayed action valve is here shown as a check valve which opens in the direction of the flow of fluid from the separator and is held normally closed by a light spring which will permit the valve to open under pressure from the separator but will close the valve when that pressure is relieved.

The separator shown in Fig. 2 is connected into the discharge line in the same manner as that above described and has the same operation but differs therefrom somewhat in construction. As there shown, the casing comprises a cylindrical body 31 confined between a lower head 32 and an upper head 33, the two heads being connected by tie rods 34 and the edges of the cylindrical body portion being packed to form tight joints. The upper end of the casing has a removable closure or top plate 35 which, in the present instance, is held in place by the tie rods 34. The lower head 32 has a depressed portion or well 36, forming a sump, and the inlet opening 37 is formed in the bottom of that well, the supply pipe 9 extending through the well and into the body of the casing. The outlet opening 38 is formed in the side of the well and is connected with the pipe 10. A separating element 39 is formed of foraminous material such as fine mesh wire screen and is carried by a bottom plate 40 having a central opening to receive the upper end of the inlet pipe 9. Preferably the plate 40 of the separating element is provided with a boss 41 surrounding the opening therein and rests upon a shoulder on the pipe 9, it being held in that position by a spring 42 confined between the upper end of the separating element and the removable closure 35. In this instance the vent tube 43 extends into the casing exteriorly of the separating element and has its inlet end near the top of that element. It is here shown as having an extensible upper portion 44 to permit the intake to be adjusted with relation to the separating element. The liquid enters the casing through the separating element and compresses the air in the casing and maintains the liquid at the desired level in the manner above described, thus preventing any appreciable quantity of air or vapor from escaping through the outlet pipe. The casing 31 may be of any suitable material and if it is desired to observe the operation within the casing the body of the casing may be of glass.

In Fig. 3 I have shown a further modification of the separator and have shown the same as connected with a vertically arranged pump 45, the operating motor 46 being directly connected with the pump and supported above the same on a vertical axis. The pump is connected with the storage reservoir 47 by a pipe 48 and is connected with the meter 49 by pipes 50 and 51 between which the separator is interposed. The meter is connected with the hose 52 in the same manner as above described. The separator in this instance also comprises a cylindrical body portion 53 confined between the lower head 54 and an upper head 55. The separating element consists of a tubular member having a lower imperforate section 56 and an upper foraminated section 57. The upper head 55 of the casing has an opening of sufficient size to permit the insertion and removal of the separating element and this opening is normally closed by a cap 58. The inlet pipe 50 opens through the lower head of the casing directly into the separating element. The outlet pipe 51 is connected with the upper head of the casing and is provided with an extension 59 leading downwardly into the casing exteriorly of the separating element and having at its lower end a foot valve 60. The vent tube 61 enters through the lower head of the casing and extends to a point near the upper end of the separating element. Both the inlet and outlet being arranged at the lower portion of the casing it will be obvious that the operation will be the same as that described in connection with Fig. 1.

It will be apparent from the foregoing description that I have provided a separator comprising a casing and a foraminated separating element interposed between the inlet and the outlet for the casing. In the several forms here shown the inlet communicates directly with the interior of a hollow separating element but this arrangement is not essential to the operation of the device. The arrangement is such that the liquid will escape from the casing more slowly than it enters the same, thereby causing the air in the casing to be confined under pressure and this pressure is so controlled as to maintain the level of the liquid a substantial distance above the inlet and the outlet so that the air and vapor entering the casing with the liquid will rise to the top of the casing rather than to pass through the separating element and will thereby be prevented from escaping through the outlet.

In addition to separating the air and vapor from the liquid delivered to the meter the separator accomplishes various other important results. When the nozzle valve is suddenly closed while the pump is in operation the whole discharge line is subjected to a severe shock which is liable to injuriously affect the meter. When the separator is interposed in the discharge line the air confined under pressure therein acts as a cushion which absorbs the shock and prevents any considerable portion thereof from being transmitted to the meter or the pipe line, and further prevents pulsations from the pump from being transmitted to the meter. The cushioning action may be regulated by adjusting the vent tube.

The foraminated separating element acts as a screen to separate foreign matter from the liquid before it is delivered to the meter and this foreign matter settles into the sump, thus preventing grit or the like from entering the meter. Further, when the device is used for dispensing gasoline any free water contained in the gasoline which enters the separator will separate from the gasoline and settle into the sump, from which it and other foreign matter may be withdrawn through the drain cock.

The pump used in an apparatus of this kind contains a strainer, as shown at 6a, and when the strainer becomes clogged the delivery of liquid is retarded and the liquid is delivered irregularly to the meter. Under such a condition the separator acts as a pressure chamber and causes a uniform flow of fluid to the meter.

Upon the stopping of the pump the entire system returns to substantially atmospheric pressure thus relieving the several parts of the apparatus from pressure and materially reducing leakage through the stuffing box of the pump. Further, the separator permits of the expansion of the liquid, when the apparatus is exposed to the sun, without creating excessive pressure in the system.

Thus it will be apparent that I have provided a single device which serves to separate air or vapor or both from the liquid, to remove foreign matter from the liquid and thus prevent grit or the like from entering the meter, to separate water from gasoline delivered to the separator, and to protect the meter from shock and pulsations, and which also functions to equalize the delivery of liquid under abnormal pump conditions.

The apparatus is intended to and will eliminate from the liquid various gaseous substances found therein, of which air and vapor are the most common, and the terms "air", or "air or vapor", as used herein, is intended to include any such gaseous substance.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In an apparatus for eliminating free air from liquid passing through a discharge line, a casing having its upper end closed and having an inlet and an outlet, and a device interposed between said inlet and said outlet to cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing to cause portions of said air to be absorbed by the liquid.

2. In an apparatus for eliminating free air from liquid passing through a discharge line, a casing having its upper end closed and having an inlet and an outlet, and a separating element interposed between said inlet and said outlet and having a part extending into the upper portion of said casing to cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing to cause portions of said air to be absorbed by the liquid.

3. In an apparatus for eliminating free air from liquid passing through a discharge line, a casing having its upper end closed and having an inlet and an outlet, and a separating device interposed between said inlet and said outlet and having a foraminous portion which will permit the passage of liquid but will prevent the passage of air bubbles and will cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing to cause portions of said air to be absorbed by the liquid.

4. In an apparatus for eliminating free air from liquid passing through a discharge line, a casing having its upper end closed and having an inlet and an outlet, and a separating element interposed between said inlet and said outlet, extending into the upper portion of said casing and having a foraminous portion to cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing to cause portions of said air to be absorbed by the liquid.

5. In an apparatus for eliminating free air from liquid passing through a discharge line, a casing having its upper end closed and having an inlet and an outlet, and a tubular separating element mounted in said casing between said inlet and said outlet, said separating element being in open communication with said inlet and extending into the upper portion of said casing to cause free air entering said casing with the liquid to collect in the upper portion of said casing, said outlet being spaced a substantial distance below the closed upper end of said casing and being of such capacity with relation to said inlet that the liquid will rise in said casing, and exert pressure on the air in the upper portion of said casing to cause portions of said air to be absorbed by the liquid.

6. In an apparatus for eliminating free air from liquid passing through a discharge line, a casing having its upper end closed and having an inlet and an outlet, and a hollow separating element mounted in said casing between said inlet and said outlet, said separating element being in open communication with said inlet, extending into the closed upper portion of said casing and having a foraminous portion which will permit the passage of liquid but will prevent the passage of air bubbles and will cause free air entering the casing with said liquid to collect in the upper portion of said casing, said outlet being spaced a substantial distance below said closed upper end of said casing and being of such capacity with relation to said inlet that the liquid will rise in said casing and exert pressure on the air in the upper portion of said casing to cause portions of said air to be absorbed by the liquid.

7. In an apparatus for eliminating free air from liquid passing through a discharge line, a casing having its upper end closed and having an inlet and an outlet, and a device interposed between said inlet and said outlet and having an imperforate lower portion and a foraminous upper portion which will permit the passage of liquid but would prevent the passage of air bubbles and will cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing to cause portions of said air to be absorbed by the liquid.

8. In an apparatus for eliminating free air from liquid passing through a discharge line, a casing having its upper end closed and having an inlet and an outlet, and a device interposed between said inlet and said outlet to cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing, and means controlled by the liquid in said casing for relieving the air pressure when the liquid falls below a predetermined level.

9. In an apparatus for eliminating free air from liquid passing through a discharge line, a casing having its upper end closed and having an inlet and an outlet, and a device interposed between said inlet and said outlet to cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing, and a vent tube leading from the upper portion of said casing and having a restricted orifice.

10. In an apparatus for eliminating free air from liquid passing through a discharge line, a casing having its upper end closed and having an inlet and an outlet, and a device interposed between said inlet and said outlet to cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing, and a vent tube communicating with the interior of said casing above said outlet and below the top of said casing.

11. In an apparatus for eliminating free air from liquid passing through a discharge line, a casing having its upper end closed and having an inlet and an outlet, and a device interposed between said inlet and said outlet to cause free air which enters said casing with the liquid to collect in the closed upper portion of said casing, said outlet being spaced a substantial distance below said closed upper end of said casing and being of such capacity with relation to said inlet that the liquid will rise in said casing and exert pressure on the air in the upper portion of said casing, a vent tube communicating with the interior of said casing above said outlet and below the top of said casing, and a check valve in said vent tube which opens in the direction of flow of fluid from said casing and has a spring to normally close the same.

12. In a device for separating free air from liquid as it passes through a discharge conduit, a casing having its upper end closed and having a sump in the bottom wall thereof, a lateral inlet passage opening into said casing near said bottom wall, said bottom wall having an upwardly inclined portion adjacent to said sump to direct the liquid away from said sump, said casing having an outlet leading from the lower portion thereof, and a separating element arranged in said casing between said inlet and said outlet to cause free air which enters said casing with the liquid to collect in the closed upper portion of said casing, said outlet being of such capacity with relation to said inlet that the liquid will rise in said casing and exert pressure on the air in the upper portion thereof.

13. In an apparatus of the character described, a casing having its upper end closed and having an inlet and an outlet to be connected in a discharge line, and a device interposed between said inlet and said outlet to cause free air which enters said casing with the liquid to collect in the closed upper portion of said casing, said outlet being spaced a substantial distance below said closed upper end of said casing and being of such capacity with relation to said inlet that the liquid will rise in said casing and cam press the air in the upper portion of said casing to form a cushion which will absorb shocks transmitted to the liquid in said discharge line.

In testimony whereof, I affix my signature hereto.

ERIC HEYWOOD BRADLEY.